(12) United States Patent
Bull et al.

(10) Patent No.: US 7,162,107 B2
(45) Date of Patent: Jan. 9, 2007

(54) METHOD AND APPARATUS FOR IMPROVING FREQUENCY RESPONSE IN MODE CONVERTERS

(75) Inventors: Jeffrey D. Bull, Vancouver (CA); Mark Fairburn, Vancouver (CA); Nicolas August Fleming Jaeger, Vancouver (CA)

(73) Assignee: Versawave Technologies Inc., Burnaby (CA)

( * ) Notice: Subject to any disclaimer, the term of this patent is extended or adjusted under 35 U.S.C. 154(b) by 14 days.

(21) Appl. No.: 10/953,461

(22) Filed: Sep. 30, 2004

(65) Prior Publication Data

US 2006/0067599 A1  Mar. 30, 2006

(51) Int. Cl.
 *G02B 1/035* (2006.01)
 *G02B 6/00* (2006.01)
(52) U.S. Cl. .......................................................... 385/2
(58) Field of Classification Search .................... 385/2, 385/3, 8–10
 See application file for complete search history.

(56) References Cited

U.S. PATENT DOCUMENTS

| 5,150,436 | A | 9/1992 | Jaeger et al. |
| 5,566,257 | A | 10/1996 | Jaeger et al. |
| 6,192,167 | B1* | 2/2001 | Kissa et al. ..................... 385/3 |
| 6,674,927 | B1* | 1/2004 | Ibukuro ........................ 385/3 |
| 6,825,964 | B1* | 11/2004 | Singh et al. ................. 359/248 |
| 2002/0076161 | A1* | 6/2002 | Hirabayashi et al. ......... 385/40 |
| 2003/0068111 | A1* | 4/2003 | Gopalakrishnan .............. 385/2 |

* cited by examiner

*Primary Examiner*—Michelle Connelly-Cushwa
(74) *Attorney, Agent, or Firm*—Jeffrey M. Measures; Borden Ladner Gervais LLP (57) ABSTRACT

A semiconductor based electro-optic modulator comprising a capacitively coupled ground allowing for DC biasing of the modulator and a pre-distortion circuit for alleviating RF skin effect and for increasing bandwidth of modulator. Electrical components and functions of modulator partly located on an alumina pane. Reduction of thermally-induced stresses by connecting modulator ground to package ground via alumina pane is also disclosed.

13 Claims, 5 Drawing Sheets

METHOD AND APPARATUS FOR IMPROVING FREQUENCY RESPONSE IN MODE CONVERTERS

FIELD OF THE INVENTION

The present invention relates generally to electro-optic modulators. More particularly, the present invention relates to electro-optic modulators having extended bandwidths.

BACKGROUND OF THE INVENTION

Electro-optic modulators are used in optical communications systems to rapidly modulate and optical signal in accordance with an electrical signal. In an electro-optic mode converter, a type of electro-optic modulator, an input beam of light having an input state of polarization (SOP) impinges on and traverses through an electro-optic waveguide that is subjected to an applied electric field. The applied electric field modifies the modal properties of the waveguide via the electro-optic effect. When the input SOP is not aligned with a principal axis of the waveguide, and the propagation speed of the light through the two principle axes differs, the beam of light at the output of the waveguide will generally have an output SOP different from the input one. With proper choice of input SOP, waveguide geometry and applied electrical field, it is possible to have the output SOP orthogonal to the input SOP. This allows the use of the electric field to control the mode conversion so that the output optical signal is modulated in accordance with a signal used to generate the electric field.

Structurally, an electro-optic mode converter or a modulator will usually include an electro-optic guiding layer such as a III–V semiconductor or $LiNbO_3$-type material, an optical waveguide defined in the optical guiding layer and an electrode structure disposed in the vicinity of the optical waveguide. As a voltage is applied to the electrodes, an electric field is formed across the optical waveguide and modifies the modal properties of the waveguide such as the orientation of its principal axes and/or its birefringence thus allowing for a modification of the SOP of a light beam traversing the optical waveguide. In the ideal, the principle axes are rotated to 45° from an X-Y orientation, and the birefringence of the axes is then modulated to control the phase relationship of the two fundamental hybrid optical modes. The phase relationship in turn determines the output SOP.

U.S. Pat. No. 5,566,257, hereinafter referred to as '257, issued Oct. 15, 1996 to Jaeger et al., which is incorporated herein by reference, discloses an electro-optic modulator having an electrode structure with two spaced apart conductive strips or electrodes disposed on either side of a single semiconductor optical waveguide. Each electrode includes projections, or fins, projecting towards the other conductive strip and disposed so as to affect the optical permittivity tensor of the waveguide material upon a voltage being applied to the electrodes. At the end of the projections, adjacent the waveguide, are pads, the geometry of which having an impact on the electrode structure capacitance.

The electrode structure of '257 is referred to as a "slow wave" electrode structure because it matches a microwave index to the optical index of the waveguide, so that a signal applied to the electrodes propagates through the signal path at the same velocity that the optical signal propagates through the waveguide. As a result, the optical signal can be cleanly modulated in accordance with the changing electric field generated by the application of a signal to the electrodes.

The teachings of '257 provide an electro-optic modulator requiring less electrical and optical power and capable of running at higher frequency than Mach-Zehnder type slow wave modulators such as described in U.S. Pat. No. 5,150,436, hereinafter referred to as '436, issued Sep. 22, 1992 to Jaeger et al., which is incorporated herein by reference.

For efficient operation, electro-optic mode modulators such as the one disclosed in '257 usually require a bias voltage to adjust the operating point of the modulator. The bias voltage may be applied to the signal electrode with the ground electrode connected to the ground of the package housing the mode converter in order to achieve current return. This method of biasing requires that a DC blocking circuit be disposed at the input of the electrode structure in order to prevent excessive voltage due to the biasing voltage from appearing in the modulation driving circuit. Furthermore, the DC blocking circuit must be such that it does not affect the modulation signal across the operational bandwidth of the modulator.

It would thus be desirable to have a mechanism for applying a biasing voltage to the mode converter that does not require a DC blocking circuit and that does not impair the operational bandwidth of the mode converter.

Additionally, electro-optic modulators as disclosed in '257 tend to have their electrodes exhibit a resistive loss of the electrical signal that increases as the frequency of the electrical signal is increased. This is due to the skin effect and leads to a substantial reduction of the electro-optic bandwidth of the modulator.

Consequently, it would be desirable to have a mechanism for alleviating the frequency dependent skin effect.

Another concern for electro-optic mode converters or modulators such as disclosed in '257 relates to their grounding. In order for the mode converter or modulator to exhibit proper radio frequency (RF) behaviour, the ground electrode of the modulator should be in electrical contact with the ground of the modulator package and, the connection length between the modulator and package grounds should be as short as possible. Conventional methods of accomplishing this connection usually lead to the appearance of mechanical stress in the mode converter as the temperature of the package varies. Such stresses adversely affect the performance of the mode converter, and can induce an unwanted strain-optic effect in the waveguide that changes its known parameters.

It would thus be desirable to have a grounding mechanism that provides proper RF behaviour and does not affect the mode converter performance as the temperature of the package housing the mode converter is varied.

SUMMARY OF THE INVENTION

It is an object of the present invention to obviate or mitigate at least one disadvantage of previous electro-optic mode converters.

In a first aspect of the present invention, there is provided an electro-optic modulator. The modulator comprises and AC coupled ground electrode, a signal path electrode and a waveguide. The signal path electrode carries an electrical signal, and is disposed substantially parallel to the AC coupled ground electrode. The waveguide is disposed between the signal path and AC coupled ground electrodes. The waveguide transmits an optical signal and modulates the polarization of the optical signal in accordance with an electric field generated between the signal path and AC coupled ground electrodes in response to the transmission of the electrical signal through the signal path electrode.

In an embodiment of the first aspect of the present invention, the AC coupled ground electrode and the signal path electrode each include a series of projections, extending from an edge towards the waveguide, and each of the series of projections imparts a capacitance to the signal path. In another embodiment, the AC coupled ground electrode includes a plate capacitively coupled to ground by at least one capacitor, the capacitor optionally being formed by having the AC coupled ground electrode is connected to a plurality of ground plates by a dielectric, the connection through the dielectric forming a capacitor to capacitive couple the AC ground electrode to ground. In a further embodiment, the electro-optic modulator includes a biasing means coupled to the AC coupled ground electrode. The biasing means biases the AC coupled ground electrode, the bias level can be used to set an operating point for the modulator.

In another embodiment, the signal path electrode includes a signal path input for receiving the voltage signal and a signal path terminal end having resistive termination to attenuate back reflections, where optionally the signal path electrode is disposed on an optical semiconductor chip and the signal path input and the signal path terminal end, are disposed on a separate chip and are connected to the signal path electrode by bond wires. In another embodiment of the present invention the waveguide is disposed on a semiconductor material, which is optionally $Al_xGa_{1-x}As$, x being selected from 0 and 1. In another embodiment, the electro-optic modulator includes a predistortion network connected to an input to the signal path electrode, the predistortion network for distorting signals transmitted across the signal path electrode to compensate for signal distortion in the signal path electrode, where optionally the predistortion network includes interconnected resistors and capacitors to distort the signals to compensate for skin effect resistive loss in the signal path electrode.

In other embodiments, the AC coupled ground electrode is mounted on the surface of a first chip, and is capacitively coupled to a ground plate on the surface of a second chip, which is connected to a ground plane on the base of the second chip by at least one of vias and edge wrap around connections. In one embodiment, the AC coupled ground electrode is indirectly capacitively coupled to the ground plate.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a system for extending the operational bandwidth of an opto-electronic polarization modulator.

In the system of the present invention, an electrical signal path is used as an electrode, as is an AC coupled ground. As an electrical signal is applied to the electrical signal path, an electric field is generated between the electrodes. This electric field is used to modulate the polarization state of light input to the modulator. The AC coupled ground allows for the application of a DC biasing voltage, which allows easy selection of an operating point of the circuit. The AC coupling is achieved by capacitively coupling a DC biased plate to a ground plate. The physical connection can be a series of ground plates, on the same chip, or to a single ground plate, with a dielectric disposed between the two. This creates a distributed capacitance between the two plates, which appears substantially as a short circuit over the operational bandwidth of the modulator, and an open circuit to the applied DC voltage. As a result, a biasing voltage can be applied, without the difficulty experienced in the prior art. The use of a series of ground plates allows for a discretized distributed capacitance, so that in the event that one of the segments has the dielectric misapplied, the capacitive coupling is still maintained. Further enhancements, including the use of discrete large capacitors connected to the AC coupled ground allow the ground to have the desired characteristics while maintaining a wide frequency response band.

Figure 1:
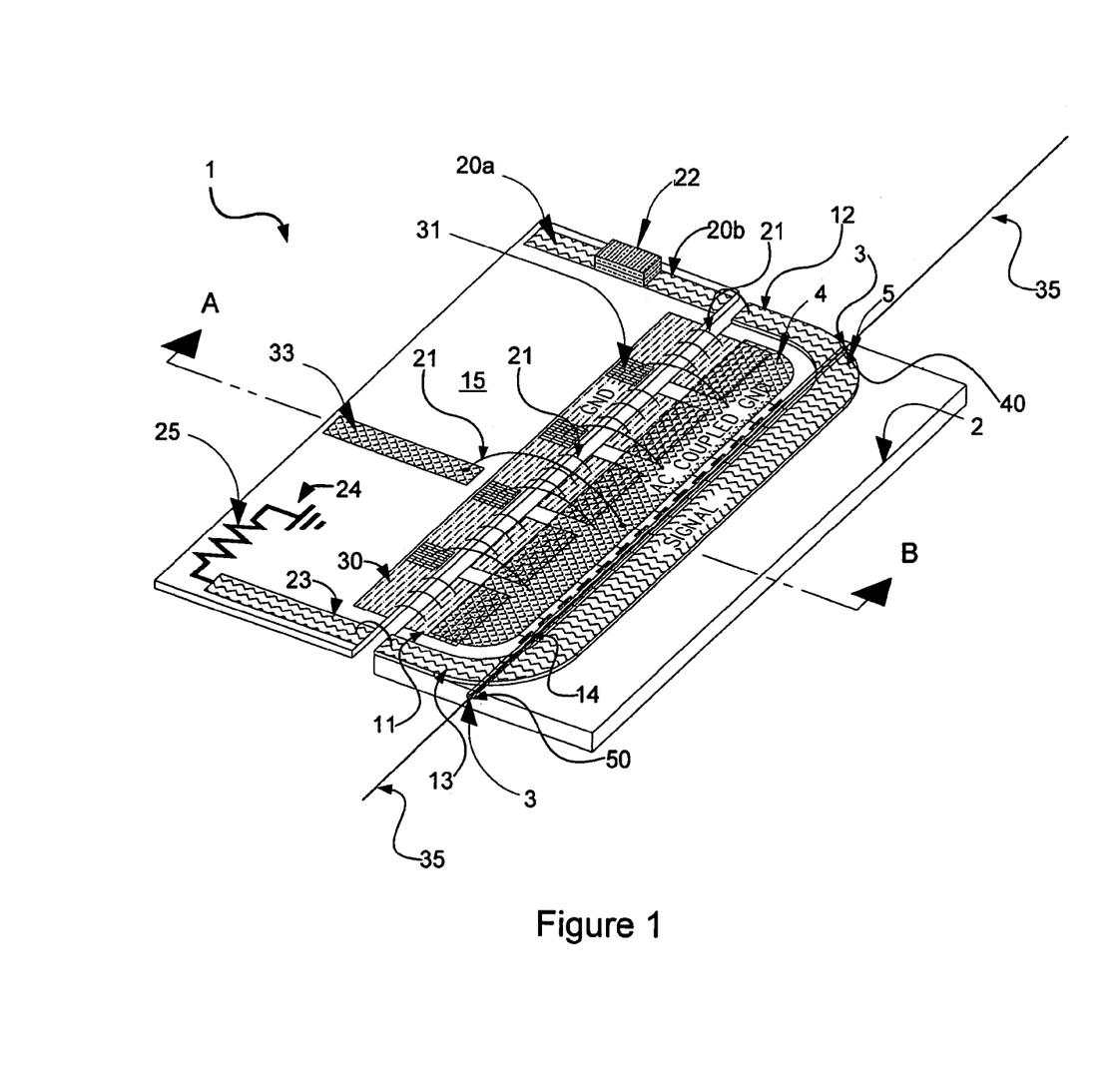
FIG. 1 is a perspective view of a preferred embodiment of the electro-optic modulator.

A perspective view of a preferred embodiment of the present invention is shown in FIG. 1. There, electro-optic modulator 1 is shown as having a first chip 2, which includes a semiconductor material and an electro-optic semiconductor-based waveguide 3, disposed between a first electrode 4 and a second electrode 5. The semiconductor-based waveguide 3 is preferably a ridge waveguide including $Al_xGa_{1-x}As$, x being between 0 and 1.

Figure 2:
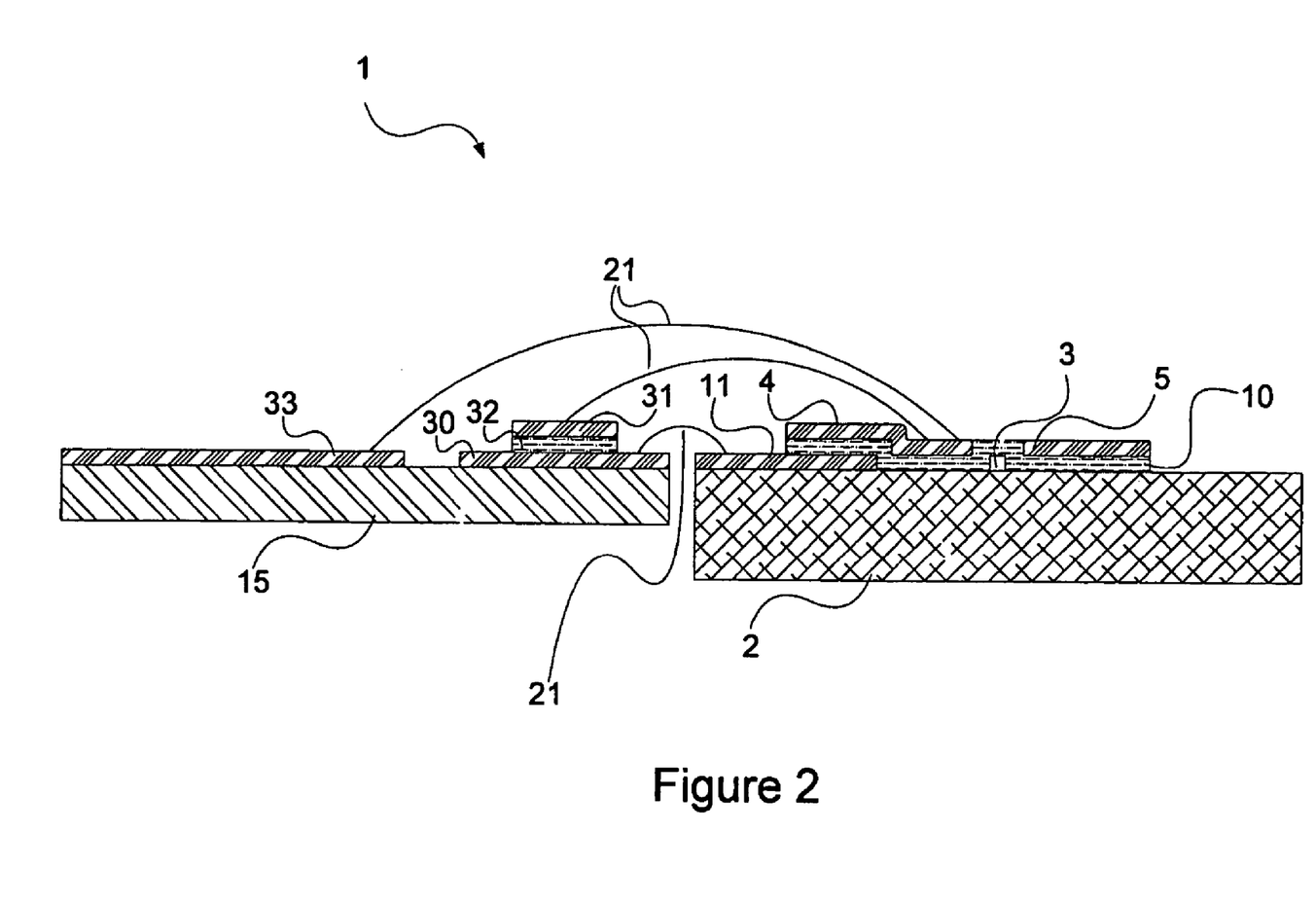
FIG. 2 is a cross-sectional view of the electro-optic modulator of FIG. 1.

As seen in FIG. 2, which is a cross-sectional view taken along line AB of FIG. 1, first electrode 4 is disposed atop an insulating layer 10, which is overlapping grounding pads 11. Grounding pads 11 may be disposed on an insulating buffer layer (not shown).

Also depicted in FIG. 1, are first end 12 and second end 13 of the signal path electrode 5. Additionally, first electrode 4 and second electrode 5 are shown as being substantially parallel to each other and to waveguide 3. However, such parallelism is not necessary to practice the present invention.

Continuing with FIG. 1, first electrode 4 and second electrode 5 are provided with a plurality of projections 14 extending from a side of the electrodes towards waveguide 3. Projections 14 are for imparting a capacitance to modulator 1. Some possible designs of projections 14 have been previously disclosed in '257 and '436 where the appellations "fins" and "fins" with "pads" are used instead of "projections".

Another chip, chip 15, is shown disposed on the left hand side of chip 2 and is preferably made of an insulator material containing, for example, alumina i.e. $Al_2O_3$. Chip 15 includes conductive input segments 20*a* and 20*b*, the latter being in electrical contact with first end 12 of electrode 5, the electrical contact being provided by one of conductive wires 21, which are preferably gold wires. Disposed between conductive input segments 20a and 20b, and electrically coupled to conductive input segments 20a and 20b, is a pre-distortion circuit 22, also referred to as a predistorer, which will typically include, but is not limited to, a resistor and a capacitor. Predistortion circuit 22, as illustrated, is part of the presently preferred embodiment, but should not be viewed as essential.

Chip 15 is also depicted as including conductive terminal segment 23 being in electrical contact with second end 13 of signal path electrode 5, the electrical contact being provided by a bond wire. Connected between conductive terminal segment 23 and ground 24 is resistive termination 25. One skilled in the art will appreciate that the signal path is resistively terminated to ensure that constant impedance is found on all parts of the signal path. Chip 15 includes ground electrode 30 which is in electrical contact with grounding pads 11 using a set of conductive wires 21. Additionally, capacitors 31 are disposed atop ground electrode 30, and can be formed by sandwiching insulating layer 32 between a top plate and the ground electrode 30 as shown in FIG. 2. Moreover, conductive bias pad 33 is disposed on chip 15 and is electrically coupled to first electrode 4 via one of conductive wires 21.

Figure 3:
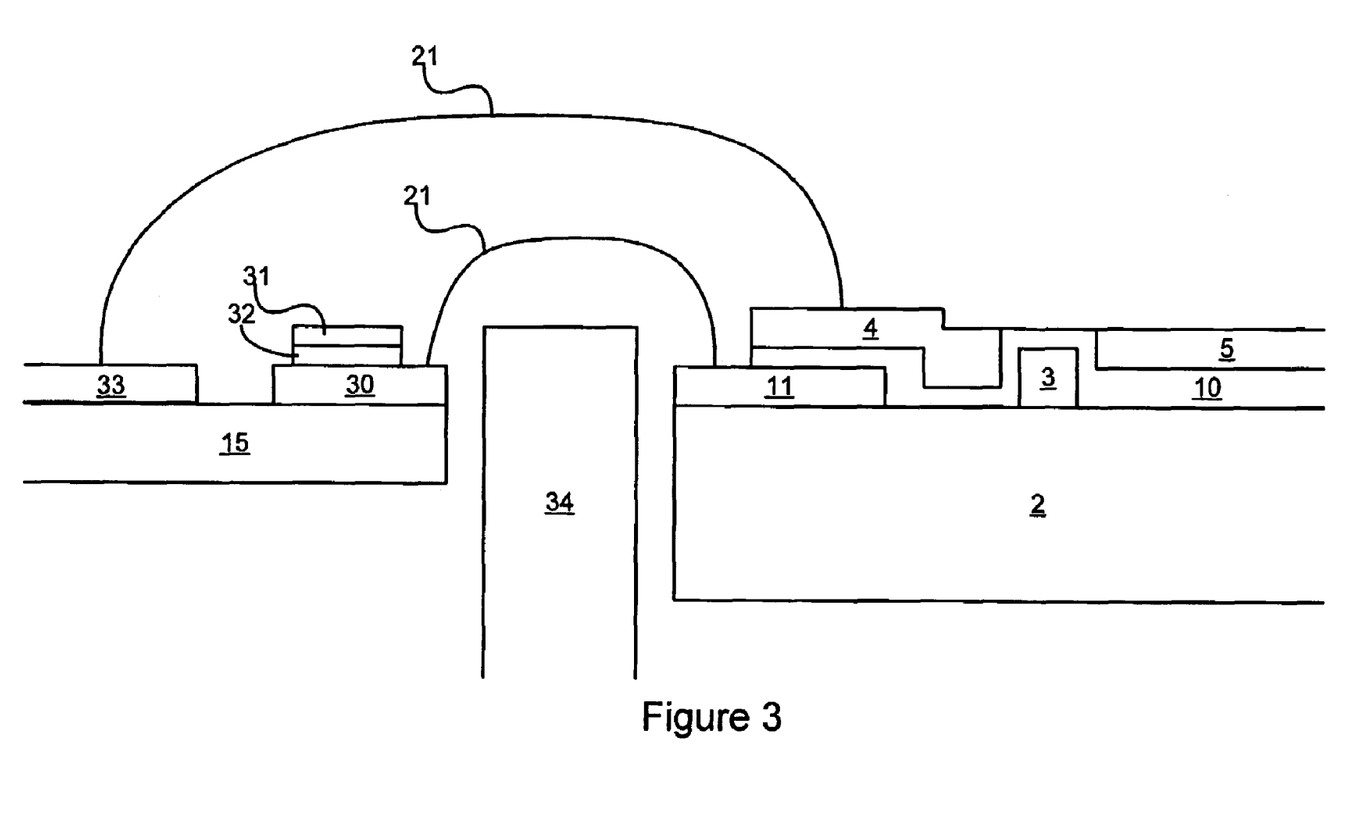
FIG. 3 is a cross-sectional view of the electro-optic modulator of FIG. 1 depicting an insulator disposed between the chips of the modulator.

An additional feature of the present invention is depicted in FIG. 3 where a space separating chips 2 and 15 includes a dielectric material 34 such as, for example, a benzocyclobutene-based polymer, for reducing impedance of conductive wires 21. The application of the dielectric material 34 is preferably done in a manner that minimizes the stress imparted to chip 2.

Fabrication and micro-fabrication techniques for depositing patterns of conductive materials on insulator and semiconductor materials as well as techniques for depositing insulating layers on insulators, conductors and semiconductors together with other fabrication techniques used in the practice of the present invention are well known in the art of device fabrication and will not be described here.

Further structural and operational features of electro-optic modulator 1 will now be described in relation to the operation of the modulator.

A light beam 35, having an input state of polarization (SOP) is provided to waveguide 3 at input port 40 and propagates through waveguide 3. An electrical signal is applied to conductive input segment 20a, and is then carried to the signal path electrode 5 over a bond wire. Prior to passing to signal path electrode 5, the input electrical signal is modified by predistorer 22 to compensate for anticipated distortion related to the skin effect resistive loss in the signal path. As a signal is carried along signal path electrode 5, an electric field is generated between electrodes 4 and 5, which resulting in a field across waveguide 3. The electric field across waveguide 3 modifies the optical properties of waveguide 3 and affects one or both of the birefringence and the orientation of principal axes of the waveguide. Light beam 35 will thus generally have its initial SOP modulated in accordance with the input electrical signal as it propagates through waveguide 3, exiting waveguide 3 at port 50. Modulation of the voltage signal leads to a modulation of the electric field, which modulates the optical anisotropy of waveguide 3 thereby modulating the SOP of light beam 35.

The electrical signal applied to signal path electrode 5 may include a high frequency AC modulation extending up to and beyond 40 GHz. At such high frequencies, the electrodes are susceptible to the skin effect. As a result, high frequency AC current has a tendency to reside near the surface of signal path electrode 5, which results in an effective augmentation of the resistive losses of modulator 1. This decreases the effective bandwidth of the system. Pre-distortion circuit 22, as previously described, can be used to intentionally distort the signal path to pre-emptively counter the skin effect. The performances of electro-optic modulator 1, using a predistortion network 22, and that of an electro-optic modulator not having a pre-distortion circuit are shown in FIG. 4.

Figure 4:
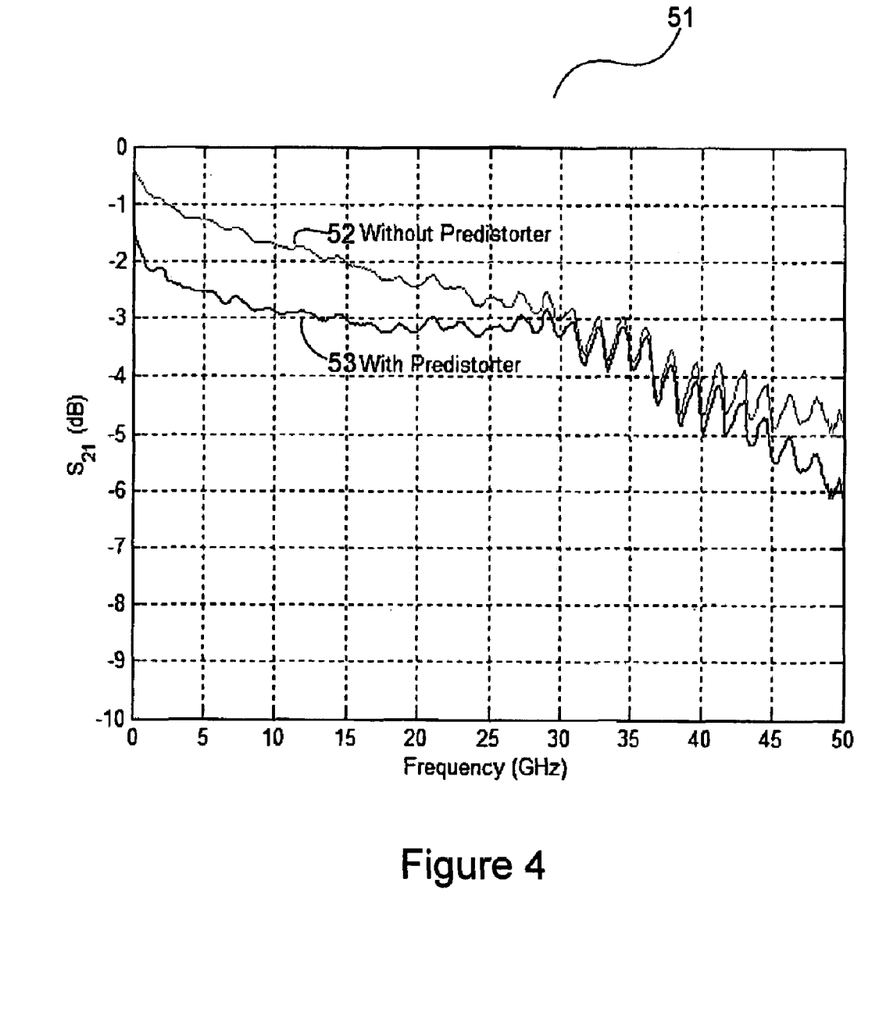
FIG. 4 is a graph showing the improved performance of the electro-optic modulator of the present invention over a prior art modulator.

FIG. 4 presents a graph 51 plotting the electro optic frequency response, or electro-optic S2, as a function of frequency. Electro-optic S21 is calculated as $20*\log10(Vo/Vi)$ where Vo is the amplitude of the optical modulation as detected by an infinite bandwidth optical power detector and Vi is the amplitude of the electrical signal applied to conductive input segment 20a. The 3 dB bandwidth of modulators such as modulator 1 is determined by using their low frequency response as the 0 dB reference and then determining the frequency at which the response decreases by 3 dB. FIG. 4 shows trace 52 measured for a modulator not having pre-distortion circuit 22. In this case, the low frequency response is −0.5 dB and, therefore, the frequency at which the response has dropped by 3 dB is approximately 35 GHz. In the case of the response of modulator 1, i.e. a modulator including pre-distortion circuit 22, trace 53 shows a low frequency response of −1.5 dB. Therefore, the frequency at which the response has dropped by 3 dB is approximately 41 GHz. Thus, in the example of graph 51, the presence of pre-distortion circuit 22 has improved the modulator bandwidth by approximately 6 GHz.

The geometry of ground electrode 4 and signal path electrode 5 is central to the performance of modulator 1. The geometry of electrodes 4 and 5 is preferably designed to match the phase velocity of the electrical signal with the group velocity of light beam 35 as it travels through waveguide 3.

Additionally, the voltage signal driving circuit (not shown) will have a nominal impedance, which is typically 50Ω. The geometry of electrodes 4 and 5 is preferably designed to have a characteristic impedance matched to the voltage signal driving circuit. In order to avoid electrical back reflections from modulator I to the voltage driving circuit, resistive termination 25 is impedance-matched to the nominal impedance of the voltage signal driving circuit and electrodes 4 and 5, and connected between conductive terminal segment 23 and ground 24.

In order to operate efficiently, electro-optic modulator 1 is usually required to function within an operating range attained through a DC bias voltage. The AC coupled ground electrode 4 can easily be DC biased to select an operating point for the modulator. In previous designs such as, for example, those disclosed in '257, it is also possible to apply a DC bias to the signal electrode. However, as mentioned above, this requires that a DC blocking circuit be disposed at the electrical input of the modulator in order to prevent excessive voltage, resulting from the DC biasing voltage, from appearing in the modulation driving circuit. Furthermore, the DC blocking circuit must be designed so that it does not affect the modulation signal across the very wide operational bandwidth of the modulator.

The present invention allows for the DC bias voltage to be applied to AC coupled ground electrode 4 by connecting a DC bias voltage source (not shown) to conductive bias pad 33, which is in electrical contact with AC coupled ground electrode 4 via a bond wire. AC coupled ground electrode 4 is capacitively coupled to grounding pads 11 and is in electrical contact with capacitors 31 via conductive wires 21. Grounding pads 11 are in turn in electrical contact with ground electrode 30 via conductive wires 21. Furthermore, capacitors 31 capacitively couple the AC coupled ground electrode 4 to ground electrode 30, which is ultimately connected to ground 24. The use of discrete high capacitance capacitors 31 extend the operation bandwidth of the system to include lower frequencies.

This manner of applying the DC bias voltage to modulator 1 provides a capacitively coupled ground, also referred to as an AC coupled ground, which alleviates the need for a DC blocking circuit at the electrical input of modulator 1. Furthermore, the capacitors formed by AC coupled ground electrode 4 and grounding pads 11 can be made to have sufficient capacitance to provide an effective low impedance ground path at low frequencies and yet, provide low inductance current paths for currents flowing into and out of AC coupled ground 4, the low inductance being important in order to maintain a low impedance at the high frequencies. Additionally, the disposition of the capacitors formed by AC coupled ground electrode 4 and grounding pads 11 along the transmission axis of the waveguide, i.e. along the line joining ports 40 and 50, allow for a substantially constant impedance along waveguide 3.

Capacitors 31 formed between ground plates and ground electrode 30 modify behaviour of modulator 1 at low frequencies and will usually have higher capacitance values than those of the capacitors formed between ground electrode 4 and grounding pads 11. This presently preferred feature provides a simple mechanism to extend the lower bandwidth of the circuit by providing a current path that appears as a low impedance at very low frequencies.

In order to prevent unwanted electrical modes of propagation along AC coupled ground electrode 4 and signal path electrode 5 upon the modulator being packaged, ground electrode 30 can be electrically connected to a package ground through ground 24. An illustration of such an embodiment is provided in FIG. 5, which illustrates a partial cross-sectional view of modulator 1. Conductive through connection 60 is disposed in a bore through ground electrode 30 and the second chip 15. Conductive through connection 60, also referred to as a via, which is in physical contact with ground electrode 30 and lower ground electrode 30b, is fastened to conductive package 62 by a conductive attach material 64, for example solder or a conductive adhesive, which is connected to ground 24. A plurality of through connections 60 are disposed in a similar manner at a plurality of locations on ground electrode 30. Alternatively, or in addition to conductive through connections 60, ground electrode 30 may include an edge wrap around connection, such as metalized wall 63, allowing electrical contact between ground electrode 30 and lower ground electrode 30b. Lower ground electrode 30b, also referred to as a ground plane, makes contact to conductive package 62 by a conductive attach material 64.

Figure 5:
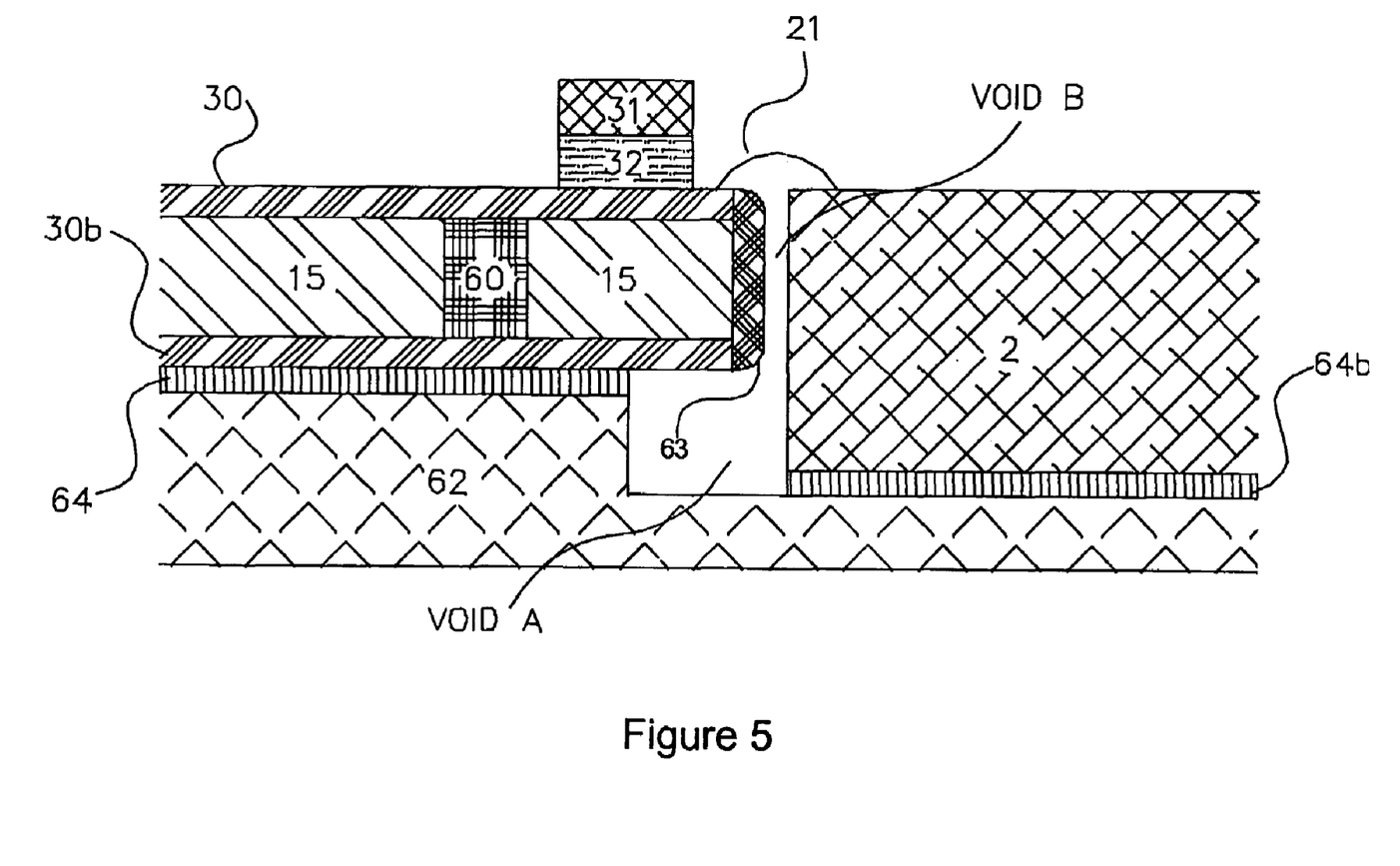
FIG. 5 is a cross-sectional view of the elector-optical modulator of FIG. 1 depicting means for grounding the modulator.

In addition to preventing unwanted electrical modes of propagation along first electrode 4 and second electrode 5, the electrical connection mechanisms of ground electrode 30 to the ground 24 allow for a substantial reduction of temperature related effects on the performance of modulator 1 by reducing the need for the optical transmission chip 2 to be secured to the packaging in a manner that would apply stress to the chip under temperature changes. Void A prevents second attach material 64b, which may be conductive or non-conductive and used to secure chip 2 to conductive package 62, from wicking upwards into void B during assembly, thereby reducing mechanical interaction (which may result from temperature changes) of chip 2 and second chip 15. Reduced mechanical interaction of chip 2 and second chip 15 facilitates maintaining a stable position of chip 2 relative to conductive package 62, allowing position of waveguide 3 to be stable relative to conductive package 62. Positional stability of waveguide 3 relative to conductive package 64 facilitates stable optical coupling into waveguide 3 at input port 40 by an input coupling system (not shown) and out of waveguide 3 at output port 50 by an output coupling system (not shown), both input and output coupling systems being in stable position relative to conductive package 62.

The structures and functions described with relation to chip 15 could be implemented in chip 2. However, some of these structures and functions are easier and more economical to implement on an insulator material such as the one of chip 15 than it is on a semiconductor material described in chip 2. As an example, implementing pre-distortion circuit 22 on chip 15 is more economical than it would be to implement it on chip 2.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An electro-optic modulator comprising:
    an AC coupled ground electrode connected to a plurality of ground plates by a dielectric, the connection through the dielectric forming a capacitive coupling to ground;
    a signal path electrode for carrying an electrical signal, the signal path electrode being disposed substantially parallel to the AC coupled ground electrode; and
    a waveguide disposed between the signal path and AC coupled ground electrodes for transmitting an optical signal, for modulating the polarization of the optical signal in accordance with an electric field generated between the signal path and AC coupled ground electrodes in response to the transmission of the electrical signal through the signal path electrode.

2. The electro-optic modulator of claim 1, wherein the AC coupled ground electrode and the signal path electrode each include a series of projections, extending from an edge towards the waveguide, each of the series of projections for imparting a capacitance to the signal path.

3. The electro-optic modulator of claim 1 further comprising a biasing means coupled to the AC coupled ground electrode, the biasing means for biasing the AC coupled ground electrode to set an operating point for the modulator.

4. The electro-optic modulator of claim 1, wherein the signal path electrode includes a signal path input for receiving the voltage signal and a signal path terminal end having resistive termination to attenuate back reflections.

5. The electro-optic modulator of claim 4, wherein the signal path electrode is disposed on an optical semiconductor chip and the signal path input and the signal path terminal end, are disposed on a separate chip and are connected to the signal path electrode by bond wires.

6. The electro-optic modulator of claim 1, wherein the waveguide is disposed on a semiconductor material.

7. The electro-optic modulator of claim 6, wherein the semiconductor material is $Al_xGa_{1-x}As$, x being selected from 0 and 1.

8. The electro-optic modulator of claim 1, further including a predistortion network connected to an input to the signal path electrode, the predistortion network for distorting signals transmitted across the signal path electrode to compensate for signal distortion in the signal path electrode.

9. The electro-optic modulator of claim 8, wherein the predistortion network includes interconnected resistors and capacitors to distort the signals to compensate for skin effect resistive loss in the signal path electrode.

10. The electro-optic modulator of claim 1, wherein the AC coupled ground electrode is mounted on the surface of a first chip, and is capacitively coupled to a ground plate on the surface of a second chip, which is connected to a ground plane on the base of the second chip by vias.

11. The electro-optic modulator of claim 10, wherein the AC coupled ground electrode is indirectly capacitively coupled to the ground plate.

12. The electro-optic modulator of claim 11, wherein the AC coupled ground electrode is indirectly capacitively coupled to the ground plate.

13. The electro-optic modulator of claim 1, wherein the AC coupled ground electrode is mounted on the surface of a first chip, and is capacitively coupled to a ground plate on the surface of a second chip, which is connected to a ground plane on the base of the second chip by an edge wrap-around connection.

* * * * *